March 28, 1967 G. A. KEMENY ETAL 3,311,454
APPARATUS FOR DETECTION AND MEASUREMENT OF CONTAMINATION
OF SULFUR HEXAFLUORIDE AND OTHER GASES
Filed Jan. 9, 1964
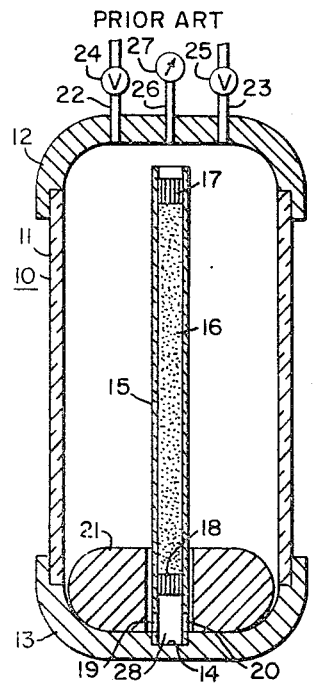
Fig. 1. PRIOR ART
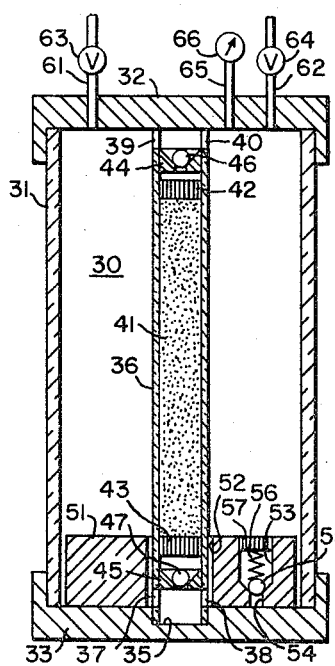
Fig. 2.
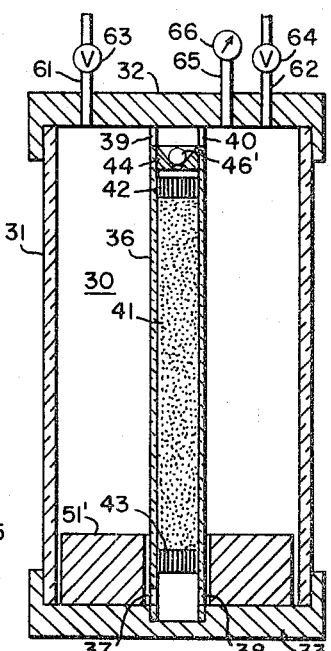
Fig. 3.
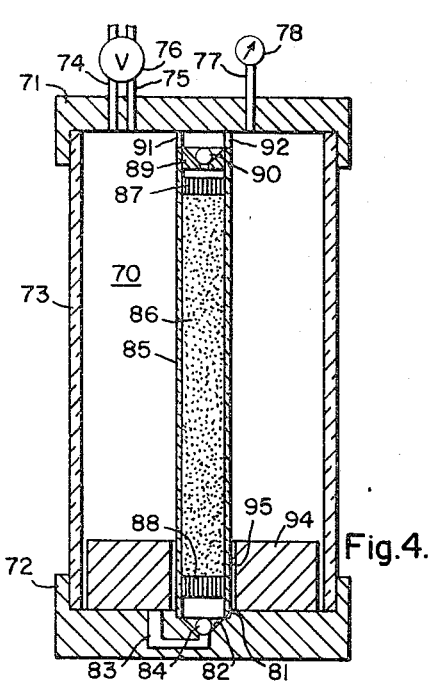
Fig. 4.
Fig. 5.
WITNESSES:
Bernard R. Giegner
James F. Young
INVENTORS
George A. Kemeny &
Harvey E. Spindle.
BY
ATTORNEY United States Patent Office 3,311,454
Patented Mar. 28, 1967

3,311,454
APPARATUS FOR DETECTION AND MEASUREMENT OF CONTAMINATION OF SULFUR HEXAFLUORIDE AND OTHER GASES
George A. Kemeny, Franklin Township, Westmoreland County, and Harvey E. Spindle, Wilkins Township, Allegheny County, Pa., assignors to Westinghouse Electric Corporation, East Pittsburgh, Pa., a corporation of Pennsylvania
Filed Jan. 9, 1964, Ser. No. 336,704
14 Claims. (Cl. 23—254)

This invention relates to improvements in apparatus for detecting contamination of a gas, and more particularly to apparatus utilizing a solid gas absorber for detecting and measuring the extent of contamination.

Generally speaking apparatus for detecting the contamination of a gas by air, such for example as sulfur hexafluoride utilized in circuit breakers, employs the method of removing oxygen from a mixture of the contaminated gas and air and measuring or detecting the resultant change in pressure in a given volume of the mixture, this change in pressure being measured and utilized as a measure of the percentage of air in the sample mixture of gases. Commercial versions are available for detecting contamination in various gases.

One such prior art device uses a sealable chamber partially filled with a liquid which absorbs oxygen from a gas mixture. A sample of the contaminated gas is drawn into the chamber at a predetermined pressure, for example atmospheric pressure, and then sealed off. By shaking or other process the gas is thoroughly mixed with the liquid and after the oxygen has been absorbed from the gas sample the change in pressure is noted. Since air is approximately 20% oxygen, by noting the change in the pressure, the percentage of oxygen or air in the contaminated gas mixture can be easily calculated.

Generally speaking these devices have certain inherent features which make them inaccurate. For example, it is usual practice to purge the inside of the chamber by drawing or forcing a considerable portion of the gas to be examined through the chamber, and then the sample to be measured is trapped in the chamber by closing valves, etc. Accurate results require that the temperature of the gas sample be allowed to stabilize to, for example, room temperature or the temperature of the apparatus itself. During this waiting period however, absorption of oxygen frequently occurs with the result that the final measurement is inaccurate, since it becomes impossible to set the pressure gauge at a correct setting before the measurement process was undertaken. In some of these liquid prior art devices a layer of non-absorbing material, such for example as oil, is allowed to rest upon the oxygen absorbing material to prevent absorption of oxygen from the gas mixture until the gas is passed by suitable means through the liquid. It has been found however that while the oil prevents absorption, the oil itself has a tendency to cling to the surface of the chamber, especially when the chamber is formed of glass as is desirable in order to visually watch the measuring process, and that droplets of oil clinging to the inner surface of the chamber reduce the accuracy of the measurement.

To avoid the necessity of utilizing a liquid, contamination detectors utilizing a solid absorber, such for example as yellow phosphorous, have been developed and are commercially available. In one such device the yellow phosphorous is enclosed in a tube in the testing chamber, and a piston inside the chamber slides on the tube and pumps the gas sample through the tube as the chamber is repeatedly held upside down and thereafter turned to an upright position. This apparatus however suffers the same disadvantage of a liquid contaminate detector without oil, in that while the gas is in the chamber awaiting temperature stabilization at room temperature or the temperature of the apparatus, the gas mixture is in contact with the solid absorber, and a certain amount of absorption takes place, with the result that the final measurement is inaccurate.

Our invention overcomes this and other disadvantages of the prior art by providing means for sealing off the tube of oxygen absorbing material or yellow phosphorous while the sample of contaminated gas is in the chamber and is being allowed to warm or cool to room temperature or the temperature of the apparatus, so that substantially no absorption takes place during this waiting period. As a result of our invention very small percentages of air can be accurately measured in the contaminated gas.

In summary, we provide a testing chamber having a tubular structure therein in which is disposed an oxygen absorbing solid material. A piston disposed in the chamber slides back and forth on the tube. At each end of the tube, in one embodiment, there is disposed a ball check valve. While the chamber is in an upright position, the check valve at the top of the tube and the check valve at the bottom of the tube seal the tube so that the gas sample in the chamber cannot pass through the tube and no substantial absorption takes place. When the chamber is turned upside down, the balls at both ends of the tube fall free opening the check valves and the pressure of the piston falling in the chamber forces air through the tube and through the oxygen absorbing material. On the return stroke, a check valve in the piston opens and permits gas to flow through the piston so that the piston falls or returns to the bottom of the chamber. In another embodiment, the piston itself seals the tube containing the absorbent material while the piston is at the bottom of the chamber. In still another embodiment the absorber tube and gas reservoir consist of parallel tubes connected by suitable headers. In this embodiment the piston is disposed in the gas reservoir tube and is actuated from the outside by a connecting rod slidable in a bore in one end of the chamber forming means and sealed by O-rings or other suitable sealing means.

Accordingly a primary object of the invention is to provide new and improved apparatus for detecting and measuring contamination of a gas.

Another object is to provide new and improved apparatus utilizing a solid oxygen absorber for measuring the percentage of air in a contaminated gas mixture.

A further object is to provide new and improved contamination measuring apparatus in which allowing the gas sample to remain in the testing chamber a sufficient time to come to room temperature or operating temperature does not result in lessening the accuracy of the measurement.

Still a further object is to provide new and improved contamination detecting and measuring apparatus utilizing a solid oxygen absorber in which gas is pumped through the absorbing material by manually operated pump means operable from outside the chamber.

These and other objects will become more clearly apparent after a study of the specification, when read in connection with the accompanying drawings, in which:

FIGURE 1 is a cross-sectional view through contamination detecting apparatus according to the prior art;

FIGURE 2 is a cross-sectional view through apparatus according to one embodiment of our invention;

FIGURE 3 is a cross-sectional view through apparatus according to a second embodiment of our invention;

FIGURE 4 is a cross-sectional view through apparatus according to a third embodiment of our invention; and FIGURE 5 is a cross-sectional view through apparatus according to a fourth and prefererd embodiment of our invention.

In FIGURE 1, a sample chamber generally designated 10 has a cylindrical wall portion 11, and upper and lower end portions 12 and 13. Bottom portion 13, which may be composed of metal or other suitable material, has a shallow circular bore 14 extending only a portion of the way therethrough, and in the cylindrical bore 14 is disposed one end of a tube 15 for containing a solid oxygen absorbing material 16. The tube 15 has near the ends thereof two porous closure members 17 and 18 for retaining the solid absorbing material 16 in the tube. Tube 15 is seen to have near the lower extremity thereof apertures 19 and 20 for admitting gas when a piston 21 is moving from the top to the bottom of the chamber, as seen in FIGURE 1.

It is seen that inlet and outlet pipes 22 and 23 are provided, having valves 24 and 25 respectively and that pipe 26 communicates with a pressure gauge 27.

In the operation of the prior art apparatus of FIGURE 1, both the valves 24 and 25 are opened, and the interior of the chamber 10 is flushed or voided by passing a substantial quantity of the gas to be tested therethrough to remove any traces of gas from the previous test sample. Then a sample of the gas to be tested is trapped in the chamber 10 by closing the valves 24 and 25 and pumped through the absorber tube after gauge reading has ben observed. The gauge 27 may be calibrated in pressure, or it may be calibrated in percentage of the impurity, in this case air. Assuming that it is desired to measure impurities of from 0.0% to 30.0% by volume, since oxygen occupies only about 20% of the volume of air, in actuality complete absorption of the oxygen from an impure sample containing 30% air would only result in a loss of pressure of approximately 6%.

Particular reference is made now to FIGURE 2, a cross-section through apparatus according to one embodiment of our invention. It was noted in considering FIGURE 1 that the gas mixture inside the chamber 10 is imediately exposed to the absorbing material 16, and that in the prior art apparatus while the mixture is waiting to come to room temperature, a certain amount of absorption can take place, although not as rapidly as when the piston 21 pumps the gas mixture through the tube 15 in response to periodically turning the chamber forming means 10 upside down and upright. In FIGURE 2, as previously stated, means is provided for sealing off the oxygen absorbing material while the gas mixture is in the chambers awaiting testing. In FIGURE 2, a chamber generally designated 30 has a cylindrical wall portion 31 of glass or other suitable material, and top and bottom portions 32 and 33 of metal or other suitable material. The bottom member 33 is seen to have a centrally disposed circular recess 35 therein in which is mounted one end of a tube 36 preferably composed of transparent material and extending the length of the chamber, tube 36 having apertures 37 and 38 at the lower end thereof for the passage of gas, and tube 36 having apertures 39 and 40 at the upper end thereof for the passage of gas. Oxygen absorbing material 41 is retained in the tube 36 by porous retaining members 42 and 43 near the ends of the tube. Because the oxygen absorbing material 41 changes color after it has absorbed oxygen and thereby provides a useful indication that the absorption process is progressing or has progressed as desired, it is also desirable that the material of absorber tube 36 be transparent, as well as the material of chamber wall 31. Near the ends of the tube and external to the aforementioned porous retaining members 42 and 43 are a pair of ball check valves 44 and 45 having balls 46 and 47 respectively. The piston 51 has a centrally disposed aperture 52 and is slidable on tube 36 in the chamber 30. It is seen that the piston 51 has therein an additional bore 53 having a portion of small diameter 54 and extending entirely through the piston to provide means for mounting an additional ball check valve, the ball being shown at 55, held in place by the tension of spring 56 abutting against a porous end or retaining member 57.

In the upper chamber sealing or end member 32, there are inlet and outlet pipes 61 and 62 with valves 63 and 64 respectively and a conduit 65 connected to a gauge 66, which may be calibrated in pressure, or may be calibrated in percentage of impurity.

In understanding the operation of the apparatus of FIGURE 2, it should be borne in mind that one primary purpose of the invention is to provide a testing chamber in which gas to be tested for contamination is isolated from oxygen absorbing material during the waiting period in which the gas is allowed to come to room temperature or the temperature of the equipment, to provide for a more accurate measurement, the gas being isolated to prevent partial absorption during the waiting period which results in an inaccurate measure of the extent of contamination. After the chamber 30 is purged by passing a quantity of the gas mixture to be tested therethrough, the valves 63 and 64 are closed trapping in the chamber 30 a sample to be tested, which may be at atmospheric pressure. The gas is then allowed to stabilize in temperature and the gauge 66, which preferably has an adjustable zero setting, or adjustable maximum setting, is set after the temperature of the gas is stabilized. During this period the balls 46 and 47 rest against the bores in their valve seats 44 and 45 respectively, sealing the entrances to the tube 36 at both ends thereof, so that no substantial amount of gas passes through the check valves 44 and 45 and no absorption of oxygen takes place during this period. The balls of the check valves, then, close the tube when the device is in upright position. When the device is turned upside down, however, the balls 46 and 47 fall free at both ends of the tube 36, and the gas sample in chamber 30 is pumped through the absorber tube by the moving annular piston 51. It will be seen that while the piston 51 is moving from end 33 toward end 32, that the pressure of the gas through porous member 57 is added to the pressure of the spring 56 and maintains the ball 55 tightly seated so that gas does not flow through the aperture 54, but all the gas is forced through the tube 36. On the return stroke when the piston 51 is moving from end 32 toward end 33, the balls 46 and 47 fall back into place and the pressure of gas in the chamber forces ball 55 upward and the gas mixture flows through the porous retaining member 57 so that the piston 51 returns to the position shown in FIGURE 2. The aforementioned apertures 39 and 40 in one end of the tube 36, and 37 and 38 in the other end of the tube 36, provide for the free passage of gas into and out of the tube 36. The weights of balls 46, 47, and 55 are so proportioned, together with the tension of spring 56, to provide for operation in the desired manner.

Particular reference is made now to FIGURE 3, where a testing chamber similar to that of FIGURE 2 is shown, except that the annular piston 51′ does not have a bore 53 therein for a check valve. The piston 51′ seals the lower end of the tube 36 by closing the aforementioned openings 37 and 38 while the piston is at the bottom of the chamber. It is also seen that in FIGURE 3 the lower check valve 45 with its ball 47 is eliminated.

In the operation of the apparatus of FIGURE 3, while the chamber 30 is in the upright position, the piston 51′ seals the lower end of the tube 36, and the ball 46′ of check valve 44 seals the upper end of tube 36. The gas mixture may remain in the chamber without coming in contact with the absorber material. When the chamber is inverted, piston 51′ moves toward the other end thereof, the ball 46′ falls free, and the gas mixture is forced through the tube 36 from end 32 of the chamber toward end 33 of the chamber. When the chamber is turned to upright position again and the piston 51′ begins to move again toward end 33, gas is forced through the apertures 37 and 38 and through the tube 36 in an upward direction, FIGURE 3, unseating the ball 46', and flowing back into the chamber 30 through openings 39 and 40. The weight of ball 46' is carefully chosen to insure that the force of gravity on piston 51' produces sufficient gas pressure to lift ball 46'.

Particular reference is made now to FIGURE 4, where a third embodiment of the invention is shown. In the embodiment of FIGURE 4, the check valve in the piston is also eliminated, and very light balls are used in the check valves controlling the ends of the absorber tube 85. In FIGURE 4, the chamber generally designated 70 has upper and lower end closure members 71 and 72 and a cylindrical wall portion 73 preferably composed of glass or other transparent material. Passing through the upper end closure member 71 are two adjacent inlet and outlet pipes 74 and 75 which go to to a joint valve 76 which in one setting opens both pipes, and in the other setting at a 90° angle thereto closes both pipes. An additional pipe or conduit 77 connects with a pressure gauge 78.

The lower end member or closure member 72 is seen to have a circular bore or aperture 81 extending a small distance in an axial direction therein, the bottom of this bore being tapered at 82 and being connected by the conduit portion 83 with the chamber 70. The ball 84 seated in conduit 83 forms a check valve and is provided as shown for purposes to be made hereinafter more clearly apparent. Disposed in the aforementioned circular aperture 81 and extending the length of the chamber 70 is a tube 85 preferably composed of transparent material containing a solid oxygen absorber 86 retained therein by porous retaining members 87 and 88. The tube 85 has a ball check valve 79 with a ball 90 at the upper end thereof and side apertures 91 and 92 in the wall portion. In the bottom of the chamber 70, as seen in FIGURE 4, there is an annular piston 94 having a central aperture 95 so that the piston is slidable with respect to the tube 85.

In the operation of the embodiment of FIGURE 4, gas flows in both directions through the tube 85. Assuming that the piston is in the position shown and the device is inverted so that the piston 94 moves from end 72 toward end 71, then both of the light balls 90 and 84 fall away from their seats, permitting gas to flow through the apertures 91 and 92 into the tube 85 and out through the conduit 83 at the other end thereof. When the device is again turned to an upright position, so that the piston 94 begins to move from end 71 toward end 72, the light balls 84 and 90 are lifted from their seats by the pressure of the gas so that the gas flows through the tube 85 from end 72 toward end 71.

Particular reference is made nw to FIGURE 5, showing a fourth embodiment of the invention. In FIGURE 5 a cylindrical chamber wall portion 101 is mounted in end members 102 and 103, forming chamber 110. In the end or cap member 102 are conduits 104 and 105 having valves 106 and 107 respectively and a conduit 108 connected to a pressure gauge 109. An absorber tube 113 having therein oxygen absorbing material 114, having therein porous retaining members 115 and 116, and having therein check valves 117 and 118 with balls 119 and 120 respectively, is mounted alongside the cylindrical chamber 101 in end members 102 and 103, spaced therefrom by spacer wall portions 99 and 100 at the ends respectively. Conduits 111 and 112 in the end closure members 102 and 103 respectively communicate between the chamber 110 and adjacent ends of the absorber tube 113.

Disposed in the chamber 110 and slidable therein is a piston 122 connected in any convenient manner, not shown, to a connecting rod 123 passing through a bore 124 in end member 103, the bore 124 being sealed by O-ring 125 in an annular groove 126.

In the operation of the apparatus of FIGURE 5, the device is left in the position shown during the waiting period to allow the temperature of the gas to stabilize. Balls 119 and 120 seal off the gas absorbing material. The device is then inverted and the balls fall away, opening valves 117 and 118. The rod 123 is then moved in a manner so that the piston 122 moves from end 103 toward end 102, and gas passes through conduit 111, through the absorber tube 113 and absorber material 114, and through conduit 112 at the other end of the tube 113 and back into the chamber 110. When the piston 122 is forced in the opposite direction, gas again flows through absorber tube 113 in the opposite direction.

It will be noted that by comparison with the prior art device of FIGURE 1, the volume of void space, that is the space 28 which serves no useful purpose, is considerably decreased in several embodiments of our invention, further improving the efficiency and accuracy of the measurement.

In summary, our invention offers the following advantages over prior art apparatus: (1) the absorber material and the gas reservoir are separated from each other so that absorption does not occur during the time that the gas is awaiting temperature stabilization with a resulting inaccuracy of measurement; (2) wetting of the walls and attendant errors are eliminated, which results in greater accuracy in the measurements, this wetting of the walls being characteristic of liquid contamination measuring devices, as previously stated; and (3) a mechanical closure isolates the gas sample from the absorber material during the waiting period required for obtaining uniform temperature.

Our apparatus is particularly suitable for measuring to a high degree of accuracy small oxygen percentages such as would occur in air contamination of sulfur hexafluoride used in a circuit breaker. In practice, when the air contamination reaches 15%, the sulfur hexafluoride is usually discarded and replaced with new uncontaminated gas. As previously stated, since oxygen comprises only 20% of air, a 15% air contamination would result in about a 3% absorption of the total gas by the absorbing material, and such a percentage can be readily detected and measured by the apparatus of all the embodiments of our invention.

As previously stated, preferably the pressure gauges 66, 78, and 109 can be zero set after the gas has stabilized as to temperature, and if desired the gauge may be calibrated in percentage air or percentage oxygen, where the particular gas mixture to be tested is known.

Whereas we have shown and described our invention with respect to some embodiments thereof which give satisfactory results, it should be understood that changes may be made and equivalents substituted without departing from the spirit and scope of the invention.

We claim as our invention:

1. Apparatus for detecting the contamination of a gas comprising, in combination, chamber forming means for trapping a sample of the gas to be tested, absorber containing means communicating with the chamber and secured to the chamber forming means in predetermined position therewith, absorbent material in the absorber containing means which absorbs at least a portion of at least one contaminating element from the gas to be tested while the gas is in contact therewith, and valve means responsive to the position of the chamber means for isolating the absorbent material from the gas in the chamber while the chamber is in a predetermined position and permitting the gas in the chamber to flow through the absorber containing means while the chamber is in an inverted position, the chamber forming means being adapted to have pressure indicating means operatively connected thereto for registering a change in pressure of the gas in the chamber resulting from absorption of a contaminating element.

2. Apparatus for detecting the contamination of a gas comprising, in combination, chamber forming means for trapping a sample of the gas to be tested, absorber containing means communicating with the chamber, absorbent material in the absorber containing means which absorbs at least a portion of at least one contaminating element from the gas to be tested while the gas is in contact therewith, and valve means responsive to the position of the chamber means including check valve means in the absorber containing means for isolating the absorbent material from the gas in the chamber while the absorber containing means is in a predetermined position and permitting the gas in the chamber to flow through the absorber containing means while the absorber containing means is in an inverted position, the chamber forming means being adapted to have pressure indicating means operatively connected thereto for registering a change in pressure of the gas in the chamber resulting from absorption of a contaminating element.

3. In apparatus for detecting the contamination of a gas, in combination, chamber forming means for trapping a sample of the gas to be tested, and means including container means containing a solid absorbent material which absorbs at least a portion of one contaminating element from the gas, the container means communicating with the chamber, the container means including at least one check valve which is responsive to the position of the chamber means and which normally isolates the absorbent material from the gas in the chamber while the gas is awaiting temperature stabilization said valve permitting the gas in the chamber to flow through the absorber container means while the container means is in an inverted position, the chamber forming means being adapted to have pressure indicating means operatively connected thereto for registering a change in pressure of the gas in the chamber resulting from absorption of a contaminating element.

4. Apparatus according to claim 3 including in addition movable means in the chamber for forcing gas in the chamber to flow through the container means while the check valve is open.

5. Apparatus for detecting contamination of a gas comprising, in combination, chamber forming means for trapping a sample of the gas to be tested and retaining said sample for a time period while the temperature thereof stabilizes and equalizes with the temperature of the chamber forming means, absorbing means adapted upon exposure to said gas to absorb one contaminating element threfrom, container means for the absorbing means and communicating with the chamber, valve means normally isolating the container means from the chamber during the temperature equalization period, said valve means permitting the gas in the chamber to flow through the container means while the chamber means is in an inverted position, and piston means disposed in the chamber and adapted upon movement thereof to force the gas through the container means whereupon the absorbing means absorbs said element from the gas changing the pressure thereof, and pressure indicating means operably connected to the chamber forming means for indicating the change in pressure in the chamber resulting from the absorption of said contaminating element.

6. Apparatus for detecting contamination of a gas comprising, in combination, chamber forming means for trapping a sample of the gas to be tested, inlet and outlet means for the chamber each including valve means, means operatively connected to the chamber for indicating the pressure of gas therein, said chamber being elongated in shape, absorber tube means mounted in the chamber and extending parallel to the longitudinal axis thereof, piston means having an aperture therein for the absorber tube means disposed in the chamber and adapted to slide along the absorber tube means from one end of the chamber to the other in response to the force of gravity exerted thereon, the absorber tube means containing a chemical substance adapted to absorb at least one contaminating element from gas coming in contact therewith, and first and second ball check valves located at the ends of the absorber tube means respectively, the first and second ball check valves being closed while the chamber forming means is in an upright position, the absorber tube means at each end thereof external to the check valve communicating with the chamber, the piston having a third check valve therein to permit the flow of gas therethrough only when the piston is moving in one direction, the piston when moving along the absorber tube means in the other direction forcing gas through open first and second ball check valves and through the absorber tube means, the chamber forming means being adapted to be inverted to cause the first and second ball check valves to open and to cause the piston to move in said other direction.

7. In apparatus for detecting contamination of a gas, in combination, chamber forming means adapted to have a sample of the gas to be tested enclosed therein, an absorber tube disposed in the chamber and housing a contaminant absorbing material, a piston in the chamber adapted to slide along the absorber tube, the absorber tube being open to the chamber at both ends thereof, and first and second check valves located at the ends of the absorber tube and normally being closed and preventing gas in the chamber from reaching the material in the absorber tube while the chamber forming means is in an upright position, said piston having an additional check valve therein, the additional check valve being closed while the piston is moving in one direction and opened while the piston is moving in the other direction, the chamber forming means when inverted causing the first and second check valves to open and causing the piston to move in said one direction and force gas through the absorber tube, the chamber forming means when returned to an upright position having the piston move in the other direction wherein the additional check valve in the piston is open and the first and second check valves are closed so that gas on one side of the piston flows to the other side of the piston without flowing through the absorber tube.

8. Apparatus for detecting contamination of a gas comprising, in combination, means forming an enclosed chamber, said means including a cylindrical transparent wall portion and end portions, means for admitting gas to an exiting gas from the chamber, pressure gauge means operatively connected to the chamber, one of the end portions having a shallow aperture therein, an absorber tube composed of transparent material mounted in said aperture and extending the length of the chamber, said absorber tube having openings at both ends thereof communicating with the chamber, movable piston means having an aperture therein and slidable on the absorber tube within the chamber, a solid absorbent material in the absorber tube which absorbs at least one contaminating element from gas coming in contact therewith, porous retaining means in the absorber tube for retaining the absorbent material therein, and ball check valve means including a movable ball disposed at one end of the absorber tube, said ball check valve means while the chamber is in an upright position and the piston means is not moving normally closing said one end of the absorber tube, said piston means while the chamber is maintained in said upright position normally preventing gas in the chamber from coming in contact with the absorbent material at the adjacent end of the absorber tube, the reversal of the chamber position causing said ball check valve means to open and causing the piston means to move along the absorber tube in response to the force of gravity thereon and force gas in the chamber to flow through the absorbent material, the absorption of a contaminating element from the gas causing a reduction of the gas pressure in the chamber which is indicated on the pressure gauge means.

9. Apparatus according to claim 8 in which the solid absorbent material is additionally characterized as changing color as a result of absorption of the contaminating element, the change in color providing a visual indication that absorption has occurred.

10. Apparatus according to claim 8 additionally characterized as including additional ball check valve means including an additional ball at the end of the absorber tube opposite to that having the first-named ball check valve means, the additional ball check valve means normally closing the opening between the adjacent end of the absorber tube and the chamber, said piston means while moving along said absorber tube toward said adjacent end of the absorber tube causing the ball of the additional check valve means to be lifted and also causing the ball of the first-named check valve means to be lifted by gas pressure and forcing gas to flow through the absorbent material.

11. Apparatus for detecting the contamination of a gas comprising, in combination, elongated chamber forming means adapted to have a sample of the gas to be tested trapped therein, an absorber tube containing absorbent material disposed in the chamber and extending axially thereof, piston means in the chamber adapted to slide along the absorber tube, two ball check valve means each including a ball at both ends of the absorber tube, said absorber tube communicating at each end thereof with the chamber by way of the ball check valve means, the ball check valve means normally closing the absorber tube from the gas in the chamber and not allowing gas in the chamber to flow through the absorbent material, both ball check valve means being closed while the chamber forming means is in a vertical position, the ball check valve means both including balls having weights such that the balls are lifted from their seats by gas pressure resulting from movement of the piston means along the absorber tube when the chamber forming means is inverted to thereby allow gas to flow from the chamber through the absorber tube.

12. Apparatus for detecting contamination of a gas comprising, in combination, chamber forming means adapted to trap a sample of the gas to be tested therein, movable piston means disposed in the chamber and adapted to apply pressure to the gas in the chamber as the piston is moved, an absorber tube located outside of the chamber and communicating at each end thereof with respective ends of the chamber, check valve means disposed at each end of the absorber tube and being responsive to the position of the chamber, contaminant absorbent material disposed in the absorber tube, the check valve means normally isolating the absorber tube from the chamber and preventing gas in the chamber from coming in contact with the absorbent material, movement of the chamber to an inverted position causing the check valve means to open, and thereafter movement of the piston means in the chamber causing gas to flow through the absorbent material.

13. Apparatus according to claim 12 including in addition means operatively connected to the piston means for moving the same.

14. Apparatus according to claim 12 including in addition pressure gauge means operatively connected to the chamber forming means, the absorption of a contaminant from the gas sample under test causing the pressure in the chamber to change thereby indicating the presence of contamination.

References Cited by the Applicant
UNITED STATES PATENTS

| | | | |
|---|---|---|---|
| 199,352 | 1/1878 | Chandler | 73—248 |
| 2,147,969 | 2/1939 | Dowling | 23—254 |
| 2,631,088 | 3/1953 | Guild | 23—254 |
| 2,867,511 | 1/1959 | Harger | 23—254 |
| 2,889,843 | 6/1959 | Simcock | 137—43 |
| 3,127,958 | 4/1964 | Szostak | 137—38 X |

JAMES J. GILL, *Acting Primary Examiner.*

RICHARD QUEISSER, *Examiner.*

J. FISHER, *Assistant Examiner.*